United States Patent
Ganesalingam et al.

(10) Patent No.: US 10,909,318 B2
(45) Date of Patent: Feb. 2, 2021

(54) METHOD FOR SUGGESTING ONE OR MORE MULTI-WORD CANDIDATES BASED ON AN INPUT STRING RECEIVED AT AN ELECTRONIC DEVICE

(71) Applicant: What3words Limited, London (GB)

(72) Inventors: Mohan Ganesalingam, Cambridge (GB); Christopher Sheldrick, Baldock (GB); Jack Waley-Cohen, London (GB)

(73) Assignee: What3Words Limited, London (GB)

( * ) Notice: Subject to any disclaimer, the term of this patent is extended or adjusted under 35 U.S.C. 154(b) by 0 days.

(21) Appl. No.: 15/541,997

(22) PCT Filed: Jan. 2, 2016

(86) PCT No.: PCT/EP2016/050001
§ 371 (c)(1),
(2) Date: Jul. 6, 2017

(87) PCT Pub. No.: WO2016/110454
PCT Pub. Date: Jul. 14, 2016

(65) Prior Publication Data
US 2018/0024987 A1 Jan. 25, 2018

(30) Foreign Application Priority Data

Jan. 6, 2015 (GB) .................................. 1500105.0

(51) Int. Cl.
*G06F 17/27* (2006.01)
*G06F 40/274* (2020.01)
*G06F 40/242* (2020.01)

(52) U.S. Cl.
CPC .......... *G06F 40/274* (2020.01); *G06F 40/242* (2020.01)

(58) Field of Classification Search
CPC ............ G06F 17/3097; G06F 17/3053; G06F 17/273; G06F 17/30554; G06F 17/30864;
(Continued)

(56) References Cited

U.S. PATENT DOCUMENTS 8,170,869 B2 * 5/2012 Rigazio ................. G06F 3/0237
704/9
8,190,628 B1 5/2012 Yang et al.
(Continued)

FOREIGN PATENT DOCUMENTS

GB 2535439 A 8/2013
WO 2014170646 A1 10/2014

OTHER PUBLICATIONS

Wikipedia, "Edit Distance", https://en.wikipedia.org/wiki/Edit_distance.

*Primary Examiner* — Michael Ortiz-Sanchez
(74) *Attorney, Agent, or Firm* — Gable Gotwals

(57) ABSTRACT

Provided is a computer implemented method, device and system for suggesting one or more multi-word candidates based on an input string of characters received at an electronic device. The method comprises the steps of a) for each of a plurality of n selected parts of a received input string, selecting m candidate words from a fixed dictionary of q words, where n, m and q each comprise positive integers, n is greater than or equal to 2 and m is less than q; and b) selecting from the resultant $m^n$ combinations of candidate words a subset p of candidate combinations of words where p is a positive integer and p is less than $m^n$. In some embodiments, the multi-word candidates can be resolved to respective unique geographical locations and a subset of the multi-word candidates or their resolved geographical locations can be presented at the electronic device for user selection. It is preferred that the plurality of n selected parts (Continued)

of the received input string comprises x words comprising the received word input string such that n=x.

14 Claims, 1 Drawing Sheet

(58) Field of Classification Search
CPC .......... G06F 17/3064; G06F 17/30657; G06F 17/30424; G06F 17/2785; G06F 17/2795; G06F 17/30; G06F 17/30286; G06F 17/30386; G06F 3/0237; G06F 17/30687; G06F 3/04895; G06F 17/21; G06F 17/2735; G06F 17/241; G06F 17/2715; G06F 17/30442; G06F 17/30654; G06F 17/30672; G06F 17/30684; G06F 17/30737; G06F 17/30401; G06F 17/30539; G06F 17/30976; G06K 9/723; G10L 2015/081; Y10S 707/99934
See application file for complete search history.

(56) References Cited

U.S. PATENT DOCUMENTS

| | | | |
|---|---|---|---|
| 8,290,772 B1 | 10/2012 | Cohen et al. | |
| 9,235,654 B1* | 1/2016 | Gupta | ................ G06F 17/3097 |
| 9,298,276 B1* | 3/2016 | Bi | ........................ G06F 3/0236 |
| 2004/0086179 A1* | 5/2004 | Ma | ........................ G06K 9/723 |
| | | | 382/177 |
| 2006/0265208 A1* | 11/2006 | Assadollahi | .......... G06F 3/0237 |
| | | | 704/9 |
| 2007/0040813 A1* | 2/2007 | Kushler | ................ G06F 3/0237 |
| | | | 345/173 |
| 2007/0074131 A1* | 3/2007 | Assadollahi | .......... G06F 3/0237 |
| | | | 715/816 |
| 2007/0168469 A1 | 7/2007 | Church et al. | |
| 2008/0147637 A1* | 6/2008 | Li | ..................... G06F 17/30672 |
| 2008/0167858 A1* | 7/2008 | Christie | ................ G06F 3/0237 |
| | | | 704/10 |
| 2009/0150322 A1 | 6/2009 | Bower et al. | |
| 2009/0174667 A1* | 7/2009 | Kocienda | ............. G06F 3/0237 |
| | | | 345/169 |
| 2012/0053926 A1* | 3/2012 | Satpute | ................. G06F 3/0236 |
| | | | 704/8 |
| 2012/0072013 A1* | 3/2012 | Hamamura | ............ G06K 9/346 |
| | | | 700/224 |
| 2013/0226563 A1* | 8/2013 | Hirate | ................. G06F 17/2795 |
| | | | 704/9 |
| 2013/0332822 A1* | 12/2013 | Willmore | ............ G06F 17/2775 |
| | | | 715/257 |
| 2014/0282203 A1* | 9/2014 | Pasquero | ............ G06F 3/04886 |
| | | | 715/773 |
| 2015/0149482 A1* | 5/2015 | Finkelstein | ....... G06F 17/30672 |
| | | | 707/748 |
| 2015/0154316 A1* | 6/2015 | Lightner | ........... G06F 17/30312 |
| | | | 707/723 |
| 2016/0132484 A1* | 5/2016 | Nauze | ................... G06F 16/367 |
| | | | 704/9 |
| 2016/0373456 A1* | 12/2016 | Vermeulen | ........ G06F 17/30675 |

* cited by examiner

METHOD FOR SUGGESTING ONE OR MORE MULTI-WORD CANDIDATES BASED ON AN INPUT STRING RECEIVED AT AN ELECTRONIC DEVICE

CROSS-REFERENCE TO RELATED APPLICATIONS

This United States application is the National Phase of PCT Application No. PCT/EP2016/050001 filed 2 Jan. 2016, which claims priority to British Patent Application No. 1500105.0 filed 6 Jan. 2015, each of which is incorporated herein by reference.

BACKGROUND OF THE INVENTION

Field of the Invention

The invention relates to a computer implemented method for suggesting one or more multi-word candidates based on an input string received at an electronic device and, more particularly, based on a multi-word input string received at the electronic device.

Background of the Invention

The use of geometric numerical coordinates to identify locations, such as latitude and longitude coordinates or grid references, is well known, and satellite based location systems generally identify locations using such numerical coordinates. One practical problem with using numerical coordinates to identify locations is that the resulting strings of numbers are very user unfriendly. In practice people generally find that strings of numbers are difficult to accurately remember or communicate verbally to others. In some cases locations are identified using other means such as post codes or street names, possibly together with building numbers, but these approaches suffer from the problem that they may be relatively inaccurate and are generally only assigned to buildings. In particular, post codes are generally only assigned to locations where it is expected that post will be delivered or picked up. As a result, these approaches are often only useful in urban areas where a high density of suitable codes, names and numbers have been assigned.

The applicant's International (PCT) patent application number PCT/GB2014/051152 filed on 14 Apr. 2014 (applicant's prior disclosed system) discloses a method of producing a location identifier. The method comprises obtaining the geographical coordinates of a location and converting the geographical coordinates into a unique group of words. The plurality of words is provided as a memorable location identifier. In a converse manner, it is possible to identify the geographical coordinates of a location from its associated unique group of words.

In applicant's prior disclosed system, a mobile electronic device user, e.g. a smart phone user, may make a request for identification of their current location or a selected location at their smart phone. In response, the smart phone obtains the current location coordinates. The coordinates are normally provided as latitude and longitude coordinates to six decimal places, for example "52.123456, –0.654321". Positional coordinates are readily available to this degree of accuracy from most satellite based navigation systems such as the system commonly referred to as 'GPS'. The obtained latitude and longitude coordinates of a location are resolved into a location identifier comprising a unique three word sequence, for example "tablet.microphone.excited" which may be point separated within the character string, although this is not essential. This conversion is carried out using a suitable reversible algorithm as described in applicant's prior disclosure.

The user may use the word sequence location in many ways including sharing the word sequence location with his/her contacts. As the process is completely reversible, the user's contacts can use their own handheld devices to resolve the word based location identifier to receive the location coordinates relating to the sender's selected location and display this on a map view on their smart phones (or other suitable devices).

A problem may arise, however, in that users may mistype and/or misremember the word based location identifier, particularly if this is being inputted sometime after receipt, resulting in their possibly receiving an incorrect resolution of a geographical location or not receiving a location output at all as a result of an irresolvable word based location identifier input, i.e. a word based location identifier which is not recognized as an acceptable input. This problem can be mitigated to some degree within a user interface by, for example, highlighting which country or, if applicable, which city a resolved geographical location is in or near to such that the user can judge whether or not it is a correct or anticipated output thereby making it apparent to the user that an error may have occurred.

There are considerable technical difficulties in identifying an error and recovering the correct three word sequence for a location. These difficulties include, but are not limited to:

(i) The required response time must be short to be user effective, but, in applicant's prior disclosed system, there are in the order of 57 trillion possible three word combinations the user might have meant, and, even on modern desk top personal computers, no procedure which scans these one at a time is feasible, even less so on handheld or mobile electronic devices.

(ii) When considering a single alternative, one needs to construct a measure of its closeness to the received original input character string or parts of such string. As this procedure will be called many times, i.e. once for each location the user might have intended, it again needs to be computationally efficient.

(iii) The method needs to adapted to operate on mobile or handheld electronic devices such as smart phones or tablet computers or the like, where memory is often limited and thus the method needs to utilize as little memory as possible.

OBJECTS OF THE INVENTION

An object of the invention is to mitigate or obviate to some degree one or more problems associated with systems for selecting or suggesting candidate words or candidate combinations of words as potential replacements for an inputted character string.

The above object is met by the combination of features of the main claims; the sub-claims disclose further advantageous embodiments of the invention.

Another object of the invention is to mitigate or obviate to some degree one or more problems associated with applicant's prior disclosed system.

Another object of the invention is to mitigate or obviate to some degree one or more problems associated with known geographical location resolution systems.

Another object of the invention is to provide a method or methods of heuristically reducing the number of locations that need to be processed, where such locations might constitute the result a user is expecting.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a computer implemented method for suggesting one or more multi-word candidates based on an input string received at an electronic device, said method comprising the steps of: a) for each of a plurality of n selected parts of a received input string, selecting m candidate words from a fixed dictionary of q words, where m, n and q comprise positive integers, n is greater than or equal to 2 and m is less than q; and b) selecting from the resultant $m^n$ combinations of candidate words a subset p of candidate combinations of words where p is a positive integer and p is less than $m^n$. It is preferred that the plurality of n selected parts of the received input string comprises x words comprising said received word input string such that n=x.

In a second main aspect, the invention provides a mobile electronic device for suggesting one or more multi-word candidates based on a received input string, the device comprising: a memory storing machine readable instructions; a processor configured to execute said machine readable instructions to implement the steps of the method according to the first main aspect of the invention.

In a third main aspect, the invention provides a system for suggesting one or more multi-word candidates based on a received input string, the system comprising; a server having a memory storing machine readable instructions and a processor configured to execute said machine readable instructions; a mobile electronic device having a memory storing machine readable instructions and a processor configured to execute said machine readable instructions; the server and the mobile electronic device being configured to communicate with each other over a network; wherein, in response to a request sent by the mobile electronic device to the server based on a received string at the device, the server implements the steps of the method according to the first main aspect of the invention.

In a fourth main aspect, the invention provides a computer readable medium storing machine readable instructions executable by a processor of a mobile electronic device for implementing the steps of the method according to the first main aspect of the invention.

In a fifth main aspect, the invention provides a computer readable medium storing machine readable instructions executable by a processor of a server for implementing the steps of the method according to the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the figures, may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 1:
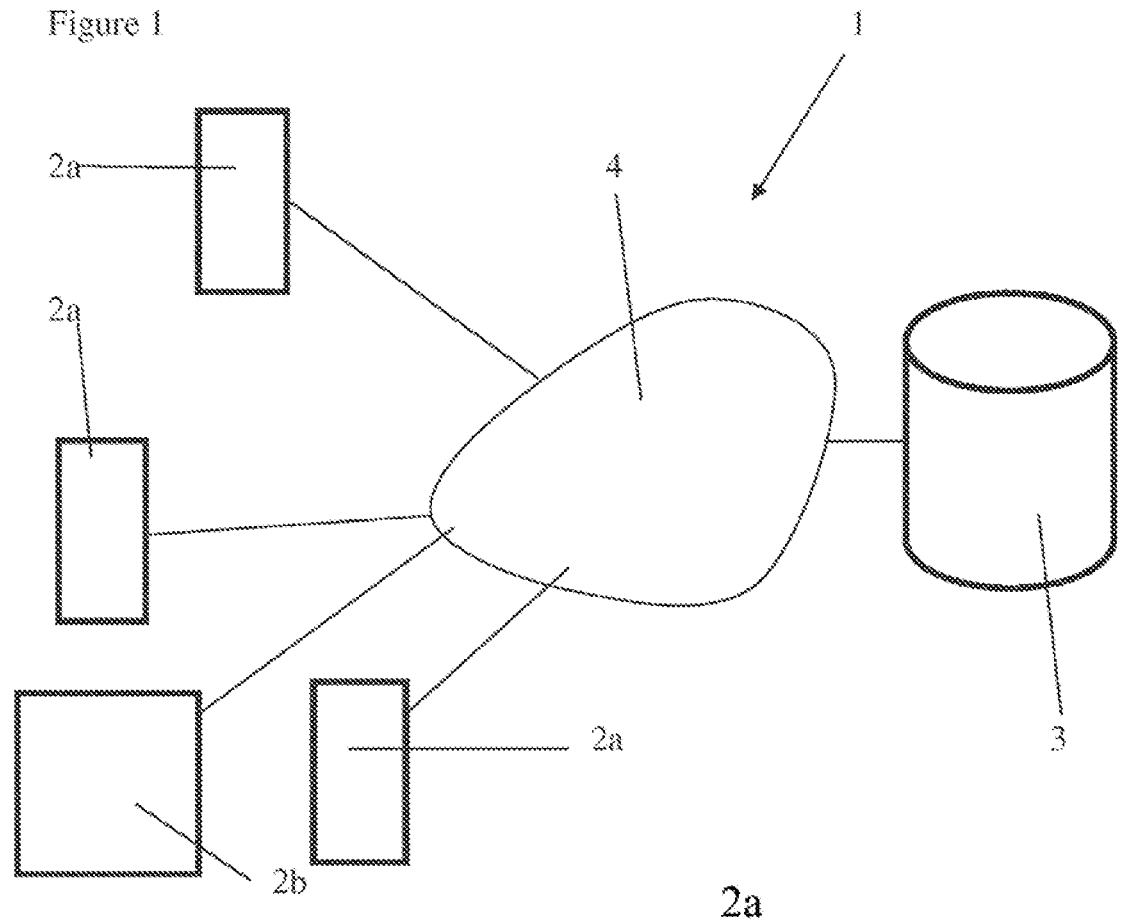
FIG. 1 is a diagram of an example of a system according to the present invention.

Referring to the figures, the system 1 of the invention comprises a number of user devices 2 and a central server 3. The user devices 2 comprise handheld and/or mobile electronic devices such as smart phones, tablet computers or the like 2a and/or personal computers (PCs) 2b. Each of the user devices 2 is capable of communicating with the central server 3 through a network such as the Internet 4, although this is not essential where the method of the invention is wholly carried out in the electronic device 2a or PC 2b. In such a case the electronic device need not be connected to a network. Although, for clarity, only three electronic devices 2a and a single PC 2b are shown in FIG. 1, it will be understood that in practice the system 1 may comprise a large number of electronic devices 2, although this is again not essential as the method of the invention may be implemented on a single electronic processing device 2.

Figure 2:
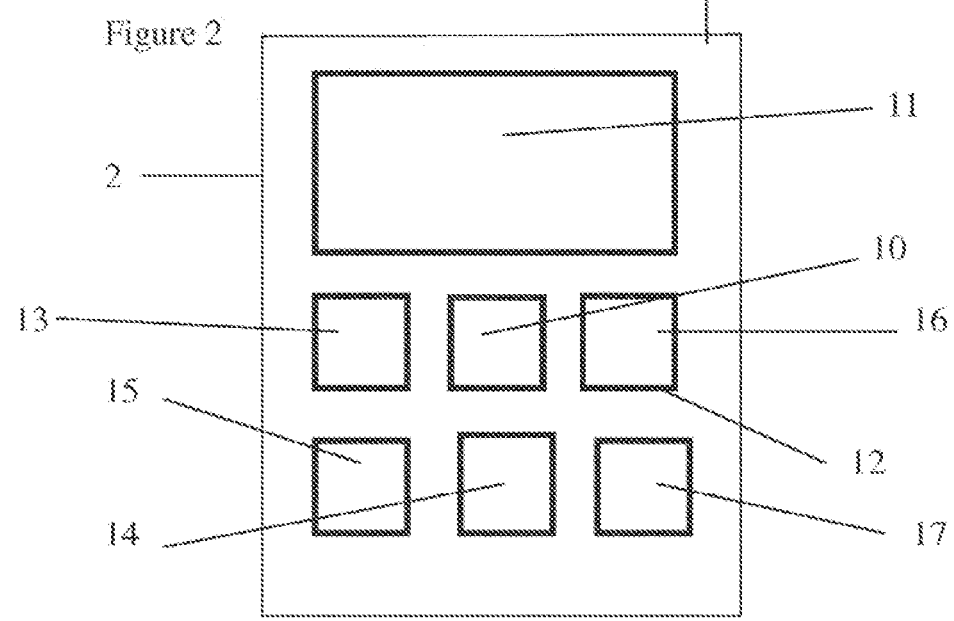
FIG. 2 is a diagram of an example of user device used in the system of FIG. 1.

FIG. 2 illustrates an example of an electronic device 2a of the system 1 in more detail. As shown in FIG. 2, an electronic device 2a includes a data processor 10, a visual display 11, a user interface 12 allowing user instructions to be input to the device 2a and information to be presented and/or displayed to the user, a speaker 13 and a microphone 14. The various components of the electronic device 2a operate under the control of the processor 10 running machine code stored in the memory. The user interface 12 may be integrated with the visual display as a touch screen display. In other examples the user interface 12 may be a dedicated keypad separate from the visual display. Electronic devices including these components are well known to the skilled person, so these need not be described in detail here. It will be understood that user PCs 2b will have similar functionality.

Further, the electronic device 2a comprises a location determining means 15, a mapping or navigation module 16, and a location identifying module 11. The navigation module 16 and location identifying module 17 are arranged to receive position information from the location determining means 15. In the illustrated example the location determining means 15 is a global positioning system such as the so-called GPS. In other examples different satellite based navigation systems may be used. The navigation module 16 and the location identifying module 17 may comprise dedicated hardware, or may comprise software programs or applications running on a processor 10 of the electronic device 2a. In some examples a user PC 2b may not comprise a location determining means 15. In some examples a user PC 2b which does not comprise a location determining means may still have access to location information from a separate location determining means such as the location determining means in the electronic device 2a.

The location identifying module 17 uses the position information provided by the location determining means 15 to provide location based services to a user.

For clarity, the operation of the system 1 with an electronic device 2a comprising a location determining means 15 will be discussed.

Generally speaking, the electronic device 2a or PC 2b is configured in one embodiment to determine geographical coordinates for a location of the device itself or a location selected by a user on the mapping or navigation module 16. These numerical coordinates can then be resolved to a word based unique location identifier on the electronic device 2a or PC 2b itself or with the assistance of the server 3 in a manner as disclosed in applicant's International (PCT) patent application number PCT/GB2014/051152 or any other suitable such system.

The method disclosed herein is not however limited to word based geographical location identifiers, but could be employed with respect to any input character string in a device or system having a dictionary or data store of acceptable words. In the context of the invention, the term 'word' is not to be taken as comprising only a natural language word, but may comprise any inputted string of characters, alphabetic, numeric or otherwise, which comprises or matches a 'word', e.g. an acceptable or predefined character string entry in a dictionary or data store of the device or system, or is intended to comprise or match any such word entry in the dictionary or data store.

In the same or another embodiment, the electronic device 2a or PC 2b by itself or in communication with the server 3 is configured to resolve a received character input string, which is preferably a multi-word character string, to an associated aspect such as a set of geographical location coordinates. In some non-location based embodiments, the received character input string is resolved to an associated aspect such as a search query or a product identifier, e.g. a barcode number or the like.

In the following description, reference will be made to the input string comprising a multi-word input string, but it will be understood that the invention is not limited to processing only multi-word input strings, but could be configured to process any input strings.

The electronic device 2a and/or the PC 2b is configured by itself or in communication with the server 3 to receive a multi-word input string and, for each word n (where n=x) in the received n-word input string, a) to select m candidate words from a dictionary of q words, where n, m and q comprise positive integers, n is greater than or equal to 2 and m is less than q. m and n are preferably one or several orders of magnitude smaller than q. For example, in an embodiment having a dictionary of q words, where q is say 40,000, n may be as small as 2 or 3 and m may be no larger than 100 and preferably as small as 30. Preferably, the dictionary of q words comprises a fixed list of acceptable words, i.e. although the dictionary may be changed in size periodically, its content and/or size does not change dynamically. The list of words in the dictionary are preferably arranged in a defined order such as alphabetic and/or numerical order.

The method includes b) selecting from the resultant $m^n$ combinations of candidate words a subset p of candidate combinations of words where p is a positive integer and p is less than $m^n$. p is optionally less than q. In the example where q is 40,000, n is say 3 and m is 100, p is preferably about 1000. In this example where there are 64 trillion possible three word combinations of the 40,000 words, the method reduces the number of selected three word candidate combinations for further consideration firstly to $100^3$, i.e. 1 million, and this is then reduced further to about 1000 candidate combinations for further processing with an eventual candidate list for presentation to a user as few as say 10.

In the method of the invention, step a) may comprise determining or assigning a respective score or ranking for some or all of the words q in the fixed dictionary for each word n in the received n-word input string to thereby select based on best scores or rankings the m candidate words from the fixed dictionary of q words for each word n in the received n-word input string. The score or ranking for some or all of the words q in the fixed dictionary for each word n in the received n-word input string may comprise a character based distance score based on a comparison between a character string for each word n in the received n-word input string and the character strings for some or all of the words q in the fixed dictionary. The character based distance score may comprise an edit distance score, but preferably comprises a weighted edit distance score such as a a weighted Levenshtein edit distance score with transpositions as operations.

The method can therefore be seen as generally comprising the correction of malformed input data where the input data is intended to match a group of acceptable or predefined character strings (words) where each word is assembled in a dictionary or data store of acceptable words.

A technical problem motivating the technique of the invention is that it is possible to identify a number of factors that can be used to judge what a user might have intended to input, but, if the 64 trillion possible three word combinations in the example mentioned above where to be processed serially to identify one or candidate combinations of words as an intended input to replace or be selected to replace a malformed input string, the process running on say a PC would take longer to run than time since the universe began.

In effect, at a general level, the method of the invention comprises using a series of methods which can be used to improve a score or ranking of a potentially intended multi-word combination in terms of their approximate speed. Then, of these methods, the first, fastest method is applied to all possibilities. Then selected are say the one million possibilities that appear best at this stage, discarding all the others thereby substantially 'winnowing' down the possible candidates for further consideration. Following this, a second, possibly slower method is applied to adjust and thus improve the quality of the scores or rankings of the million possibilities and from these are selected, say, the 1,000 possibilities that appear best at this stage, discarding all the others. The method may then include applying a third, possibly slowest method to adjust and thus improve the quality of the score of these 1000 possibilities and this may lead to a selection of a predetermined small number, say 10, of the 1000 candidates or a selection from said 1000 candidates of a reduced number of candidates meeting one or more criteria to provide a small number of candidates which appear best at this stage, discarding all the others. Such a method negates the need to process the trillions of possible combinations and, in fact, through the stepwise selection process quickly and computationally efficiently arrives at a very small number of candidate combinations of words which can be resolved to their unique aspects and one or more presented to a user of a device or system as possible candidates for a malformed input data.

A key to the functioning of this technique is that the first method, although it may be considered inaccurate, is accurate enough that it is extremely unlikely that one of the final small number, e.g. 10, best candidate combinations will lie outside the top say one million possibilities as computed by the first method alone. The second method, although it may be considered imprecise, is sufficiently accurate that it is extremely unlikely that one of the 10 best possibilities will lie outside say the top 1,000 possibilities as jointly computed by the first and second methods. And so on.

It will be appreciated that, whilst the example above mentions applying three methods in succession, there may be as few as two methods or there may be many more than three methods depending on the nature of the inputs and the degree of winnowing required for computational efficiency at the electronic device 2a, PC 2b and/or server 3.

Taking the example mentioned above where the dictionary size q=40,000, the word grouping size n=3 and the selected candidates per word or slot in the three word grouping comprises m=100, it is apparent that no computationally efficient method can be explicitly and individually applied to all 64 trillion possible groupings of three words in a 40,000 word dictionary. However, it is possible to efficiently compute some measure of goodness, e.g. a score or ranking for all 64 trillion possibilities by, explicitly or implicitly, computing a measure of goodness or 'score' for each of the three words involved in a possibility, preferably with lower scores considered as better, and then combining said measures, preferably by addition. As there are only 40000 possible words which can go in each 'slot' of a three word group, this involves at most 3×40000 computations. It is then possible, as will be described in more detail later, to use a similar implicit procedure to pick out a subset of the 64 trillion possibilities with the best, i.e. lowest scores.

The method of picking out a subset of the 64 trillion possible combinations of three words may comprise the steps of:

I. For each word of a three word input received at the electronic device 2a or PC take say the 30 or more typographically, phonetically or approximate-phonetically most similar words in the dictionary. This may be done by effectively ranking the words in the dictionary according to a particular score, which is preferably the weighted Levenshtein edit distance between said dictionary word and the received input word, or between phonetic or approximate-phonetic representations of said dictionary word and the input word. The term 'effectively' is used here because it is not always necessary to explicitly calculate the score for every word. In any event, the method enables the 30 or more words with optimal scores to be identified as candidate words m for each word n in the received input character string. Preferably, the method utilizes the standard variant of the weighted Levenshtein edit distance which considers transpositions of adjacent characters. The weights in the edit distance are preferably carefully chosen according to technical and empirical criteria.

Example: taking a received malformed input word group string of 'meo.ammoun', 'naild, for the malformed received input word 'meo', the typographically, phonetically or approximate-phonetically most similar words in the dictionary as candidates for what the user might have meant to type instead of 'meo' results in the following possibilities amongst others, shown with their resulting weighted Levenshtein edit distance:

[memo:1, veto:2, mono:2, redo:2, mojo:2, . . . ] (the 1, 2, . . . being the actual similarity score).

For 'ammoun', 'naild' the possible candidates words m include:

[amount:2, mammoth:3, hammock:3, lemon:3, famous: 3, . . . ]

[nails:1, nailed:1, nail:1, railed:2, snail:2, . . . ]

II. The three lists of candidate words for the three word input group are combined to obtain some or all possible three word suggestions or candidates for what the intended input string might have been. As there are anywhere between 30 to 300 possibilities for each word, this yields 30×30×30 through to 300×300×300 possible candidate word combinations for the intended input string. These suggestions are preferably themselves then assigned a score or ranking, and the score or ranking of each suggestion is preferably obtained by adding the already determined scores or rankings for the three words within each combination. For example: memo.amount.nails has a core of 4 (1+2+1=4) and veto.amount.nails also has a score of 4 (2+2+1=4), etc.

The combined list of all or some of the possibilities, i.e. candidate combinations of words, is preferably sorted by score or ranking, and if this is done the worst suggestions having the highest scores or rankings in this example method are then preferably discarded to thereby substantially reduce the number of candidate combinations of words for further consideration by one or several orders of magnitude. It will be understood that it may not be necessary to compute the scores of all words. It is not necessary to score or rank words which can be seen in advance as having a relatively high score or ranking which would render them or any combinations of words including them as not viable candidates.

Prior to step II, an optional step IA is to add morphologically related variants of each candidate word using a pre-computed list of variant words which is preferably stored in a compact fashion with each original word in the wordlist. So, for example, for 'memo' the variant 'memos' may be added, and for 'amount' the variants 'amounts', 'amounted' and 'amounting' may be added. Substitutions of this kind preferably incur a score penalty. If, for example, the penalty is 5, then as 'memo' has score of 1, 'memos' would have a score of 6.

Also as a further optional step IB prior to step II, reordered variants (e.g. 'amount.memo.nails') may be added as the user might have misremembered the order of the words as well as mis-typed one or more of them. These are also given a suitable score penalty as above.

Having substantially reduced the number of candidate combinations of words for further consideration by one or more orders of magnitude in step II, with or without the optional steps IA and/or IB, one or more further 'winnowing' steps may be applied to further reduce the number of candidates to be further considered.

In the case of a device or system utilizing multi-word groups as inputs for geographical locations, the further winnowing step or steps may comprise one or more of the following:

III. Computing the location of each multi-word (three word) candidate using the main algorithm as disclosed in applicant's prior disclosed patent application or any other suitable location conversion algorithm and then determining or computing a distance from said location to a known location such as the current or a last known location of the electronic device or a location selected by a user. To each three word candidate combination, a penalty score is added proportional to distance which may be a monotonically increasing function of the distance to the known location or a location selected by a user; and/or IV. For certain cases only, find the distance between the location of each 3-word suggestion and a nearest map feature such as a road or building or some other selected map feature. The score of each candidate word group combination is then adjusted by adding a penalty which increases as the distance increases and the penalty score may also be a monotonically increasing function of the distance.

Steps III and IV may be separately applied after steps I and II (and possibly also steps IA and/or IB), or steps III and IV may be applied in combination. In any event, once any penalty scores are added, the reduced number of candidate word group combinations and/or their resolved locations may be re-ordered and some or all of these presented on the electronic device 2a or PC 2b in said re-ordered form with the candidate having the lowest score presented or displayed first or most prominently. Preferably, the candidates are displayed such that a user can make a selection and invoke the result of that selection.

The scoring of candidate words is preferably based on an edit distance score, although other scoring mechanisms may be utilized. In the case of edit distance scoring there is a standard method for computing the edit distance between two word strings, see, for example, http://en.wikipedia.org/wiki/Edit distance. A technical problem with the known method is that, to be completely accurate, it requires a comparison of an input word string against each word in a dictionary containing potentially thousands of words. The normal method comprises comparing the malformed input word string against each dictionary word in turn to obtain an appropriate edit distance computation for each comparison. As this might involve, in our example, 40,000 separate invocations of the edit distance procedure, it is too computationally inefficient for the purposes of the invention. Other possible alternatives methods which increase processing speed remain too slow for the purposes of the invention and furthermore use an undesirably large amount of memory.

The solution to this problem for computing the 'closest words' to any given input word string word or part of an input string utilizes a very small amount of memory and is at least an order of magnitude faster in processing than any of the known methods as described in the applicant's co-pending patent application number GB1500104.3 filed on 6 Jan. 2015 entitled "A Method for Suggesting Candidate Words as Possible Replacements for an Input String Received at an Electronic Device".

Preferably, the process caches the result of the edit distance procedure (i.e. the "30 most similar words in the wordlist") for each of the last (say) 80 words considered, using a least recently used (LRU) cache implemented in a standard way. Thus, if the system is asked to compute suggestions for a 3-word input string combination and one or more of those input words is in the cache, the results for any such words will be returned in an almost negligible time. This is of particular use if the results are being updated as the user types an input string such that there will usually be a two-word input string overlap between one query and the next, as the user is only editing the final word. By way of example, if the queries are:

A. meo.ammoun.n
B. meo.ammoun.na
C. meo.ammoun.nai
D. meo.ammoun.nail
E. meo.ammoun.naild the edit distance results for 'meo' and 'ammoun' need not be recomputed in queries B-E.

In a next step, the standard procedure would be to take the three lists of possible replacements for each of the three words of the input string and to combine them to obtain all possible suggestions/candidate combinations of three words for the entirety of the three word input string. If, as in the earlier example, there are as many as 100 possibilities for each of the three slots, we would have 100×100×100 possibilities for the entirety of the input. Unfortunately, constructing this many possibilities explicitly turns out to be undesirably slow as well as using up an undesirable amount of memory. After constructing all one million three-word possibilities, one would conventionally sort the list and take the, say, the 1000 best items to pass to the next stage, but again this turns out to be undesirably slow in practice.

The preferred approach here is to replace the explicit combination and sort procedure by an implicit procedure comprising a modified best first search using a priority queue data structure, implemented on, say, a binary heap, although other methods of combination which are optimized for speed may be utilized.

A possible optimization is to insert items in the priority queue in a form such as [score, first-word-numerical identifier, second-word-numerical identifier, third-word-numerical identifier] which can be encoded as a single 64 bit integer with the distance score in the 16 highest bits. Since these integers are sorted by score, they can be directly inserted into the priority queue, which is much faster than having the queue contain records.

The foregoing method can improve on the standard best-first search method by exploiting a property of the input, namely the fact that the scores in a list like [memo:1, veto:2, mono:2, redo:2, mojo:2, . . . ] are monotonically increasing, to ensure that there is never an attempt to insert the same three-word item into the queue more than once. This saves on the need to keep track of a set of nodes that have been 'seen', which in turn speeds up the algorithm considerably.

It is worth noting that there are preferred variants of the edit distance which take account of the distance between keys on the relevant key on a keyboard as users are more likely to mistype a key by striking a nearby key, of the phonetic similarity of words, and of common misspellings. Furthermore, in the embodiments concerning a geographical location resolution method as disclosed in applicant's prior patent application, there is a preference for only returning candidate combinations of words or their resolved locations that comprise locations known to be on land. For example, in the dictionary of acceptable words for the geographical locations, words 25001-40000 (numbering words from 1) may be used only for sea locations. Whilst these words may be used in the variant process described below as they can be related to words in the 1-25000 range used for land locations, it is not necessary to compute scores for these words 25001-40000 if the optional variant processed is omitted.

In the optional variant process, there is no point in adding a variant word to a set of possible candidates unless that word occurs in some legal 3-word combination. Noting that the 'is a variant of' relation is reflexive, which is to say that 'amount' is a variant of 'amounted' if and only if 'amounted' is a variant of 'amount', it follows that it is only necessary to compute possible variant endings for the 40000 words in the dictionary. The notion of what is a variant has a subjective component, and for this reason the best results may he obtained by precomputing the list of variants for each of the 40000 words and distributing it as part of the application, as opposed to computing the variants during program execution. This also means that the quality of the endings data may be improved without requiring any changes to the main application program.

This optional pre-computation method has two further advantages. First, computing the variants during program execution would slow down the program. Second, it would involve the insertion of a substantial amount of extra code into the program, and the amount of code of this kind would need to be increased as further languages were added to the system.

There is one challenge involved with computing endings offline, which is that listing the variant words for each of the 40000 words could take up a substantial amount of space. Said space is required for each wordlist (one per language), and the total overall space usage would be undesirable. Any solution to this challenge faces the further problem that it must allow the determination of the set of variants of a given word rapidly and this therefore precludes compression schemes such as 'zip'.

One solution to this challenge rests on the following observations:

The wordlists tend to be comprehensive; that is, they include nearly all the words in a typical speaker's vocabulary. As a result, there is a negligible loss in performance by only computing variant words which are themselves in the wordlist.
  The 'is a variant of' relation is an equivalence relation, i.e. it is reflexive, symmetric and transitive. As a result, it is possible to partition the wordlist into equivalence classes of similar words. The wordlist is distributed in a fixed order. As a result, it is possible to represent each word by an numerical identifier such as an integer giving its position in the wordlist. That is, '1' for the first word, '2' for the second, and so on. The solution involves the following. For each class of related words, a fictional example being word 30: "index", word 792: "indexed" and word 34967: "indexing" we place the word in some arbitrary order, for example, alphabetical. Then, to the number of each word in the ordered list, except the last, we associate the number of the next word on the list; to the last word, we associate the number of the first word. Thus for example we would have:
    30->792
    792->34967
    34967->30

Once we have applied this procedure to every class of related words, we have associated each number in the range 1 to 40,000 with another such number. This information can be stored extremely compactly in an array of length 40,000. As each entry takes up 2 bytes, the entire array will only take up 80 kilobytes, which is a negligible amount of space compared to, say, the wordlist itself.

The previous stage in the algorithm returns not words, but the numbers associated with those words. Given the number associated with a word, it is trivial to find the (numbers of) related words extremely rapidly and with no space overhead using the following procedure: namely, start with the number of the given word, and move to the associated number. From that number, move to its associated number. Repeat this procedure until you return to the starting number. For example, starting with 'indexing', it would proceed: 34-967->30->792->34967. All numbers encountered during this procedure represent words (index, indexed) which are related to the original word in consideration. Such words are added to the list of possibilities unless they are already in the list.

After adding related words, words in the 25001-40000 range (e.g. 'indexing' above') may be discarded for the reasons detailed above.

Another optional step relating to reordered variants which may be amalgamated with the previous optional step comprises modifying the implicit graph used in the best first search procedure. This modification can be made significantly faster by exploiting the fact that all (n!−1) nontrivial reorderings of a given n word input will have the same score. In the case where n=3, the number of nontrivial reorderings would be 5.

In the further optional distance measurements steps specific to the geographical location method, the process of computing the locations of each of the 1000 selected combinations of words candidates can preferably be speeded up by supplying the algorithm as disclosed in applicant's prior patent application with the numerical identifiers (dictionary word list assigned numbers) of the words as opposed to the words themselves, as this short-circuits one of the five steps of the original algorithm. Then, the the distance of each of the 1000 possibilities from the user is computed preferably using the standard spherical distance haversine formula (which is more accurate and faster to compute than the alternative methods). Following this, the scores of the candidates is modified by adding a suitable function of the distance from the user. Preferably, this is of the form constant*log (1+distance to user), where distance to user is preferably measured in metres.

At this point it would be conventional to sort the list of 1000 possibilities, take the 10 best options, and pass these on to the next stage. In practice this was found to be sufficiently fast. Were this not the case (e.g. if the '1000' were replaced by a larger number in future), it would be possible to use a priority queue to keep track of only the 10 best suggestions at any given stage, avoiding the need for a final sort of the 1000 items.

In another of the optional distance measurements which comprises a computation of distance to a nearest map feature such as a road, the structure of this step is exactly as that of the previous step described above, with '1000' replaced by, say, '10'.

In the method herein disclosed, it is envisaged that, in most cases, the words of an input string form the basis for the selection of words to be processed to identify m candidates words for each of n (=x) input words. However, the procedure can be modified to handle cases where the user has entered the wrong number of quasi-words, e.g. 'meo.amm.un.naild', i.e. four words instead of three. If there are too many input words, different words may be 'fused' together and then the procedure as described herein applied. For example, the method may be applied to 'meo+amm.un.naild', 'meo.amm+un.naild', 'meo.amm.un+naild', in which '+' is a 'dummy' character rather than a word separator. If there are too few input words, one or more input words may be split at different locations and the method applied to each possibility, again taking the best results.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer implemented method for suggesting one or more multi-word candidates, said method comprising the steps of:
   a) receiving a multi-word input string at a processor of an electronic device;
   b) at said processor, selecting m candidate words from a fixed dictionary of q words for each of a plurality of n selected parts of the received multi-word input string, where m, n and q comprise positive integers, n is greater than or equal to 2 and m is greater than or equal to 2 but less than q;
   c) at said processor selecting from the resultant $m^n$ combinations of candidate words a subset p of candidate combinations of words where p is a positive integer and p is less than $m^n$;
   wherein each combination of candidate words of the resultant $m^n$ combinations of candidate words comprising n words; and
   d) presenting a list of candidate combinations of words from the subset p of candidate combinations of words for selection of one candidate combination of words to be input to a location identifying module of the electronic device, said location identifying module resolving the selected candidate combination of words to numerical location coordinates.

2. The method of claim 1, wherein step a) comprises determining or assigning a respective score or ranking for some or all of the words q in the fixed dictionary for each of the n selected parts of the received multi-word input string to thereby select based on best scores or rankings the m candidate words from the fixed dictionary of q words for each of the n selected parts of the received multi-word input string.

3. The method of claim 2, wherein the score or ranking for some or all of the words q in the fixed dictionary for each of the n selected parts of the received multi-word input string comprises a character based distance score based on a comparison between a character string for each of the n selected parts of the received multi-word input string and the character strings for some or all of the words q in the fixed dictionary.

4. The method of claim 3, wherein the character based distance score comprises any of an edit distance score, a weighted edit distance score, a Levenshtein edit distance score, a weighted Levenshtein edit distance score, an edit distance score considering transpositions, a weighted edit distance score considering transpositions, a Levenshtein edit distance score considering transpositions, or a weighted Levenshtein edit distance score considering transpositions.

5. The method of claim 1, wherein step b) comprises determining or assigning a respective score or ranking for some or all of the candidate combinations of words to thereby select based on best scores or rankings the subset p of candidate combinations of n words.

6. The method of claim 5, wherein step b) comprises selecting the subset p of candidate combinations of n words by using a priority queue data structure optionally implemented on a binary heap.

7. The method of claim 1, wherein the fixed dictionary comprises an ordered list of words.

8. The method of claim 1, wherein the candidate combinations of words can each be resolved to a unique aspect and the method further comprises the steps of resolving some or all of the candidate combinations of n words to their unique aspects and selecting a subset of said uniquely resolved aspects for presentation at the electronic device.

9. The method of claim 8, wherein the resolved aspect for a candidate combination of n words comprises a unique geographical location.

10. The method of claim 9, wherein the rankings or scores for each resolved geographical location comprises a determination of a distance of each resolved geographical location to a current or last known location of the electronic device and/or a distance of each resolved geographical location to a nearest predetermined map based feature.

11. The method of claim 1, wherein the method is implemented wholly on the electronic device.

12. The method of claim 1, wherein the method is a server based method.

13. An electronic device for suggesting one or more multi-word candidates, the device comprising:
a memory storing machine readable instructions;
a processor configured to execute said machine readable instructions to implement the steps of the method comprising:
a) receiving a multi-word input string at a processor of an electronic device;
b) at said processor, selecting m candidate words from a fixed dictionary of q words for each of a plurality of n selected parts of said received multi-word input string, where m, n and q comprise positive integers, n is greater than or equal to 2 and m is greater than or equal to 2 but is less than q;
c) at said processor selecting from the resultant $m^n$ combinations of candidate words a subset p of candidate combinations of words where p is a positive integer and p is less than $m^n$; wherein each combination of candidate words of the resultant $m^n$ combinations of candidate words comprises n words; and
d) presenting a list of candidate combinations of words from the subset p of candidate combinations of n words for selection of one candidate combination of n words to be input to a location identifying module of the electronic device, said location identifying module resolving the selected candidate combination of n words to numerical location coordinates.

14. A non-transitory computer readable medium storing machine readable instructions executable by a processor of an electronic device for implementing the steps of the method comprising:
a) receiving a multi-word input string at a processor of said electronic device;
b) at said processor, selecting m candidate words from a fixed dictionary of q words for each of a plurality of n selected parts of said received multi-word input string, where m, n and q comprise positive integers, n is greater than or equal to 2 and m is greater than or equal to 2 but is less than q; and
c) at said processor, selecting from the resultant $m^n$ combinations of candidate words a subset p of candidate combinations of words where p is a positive integer and p is less than $m^n$;
wherein each combination of candidate words of the resultant $m^n$ combinations of candidate words comprises n words; and
d) presenting a list of candidate combinations of n words from the subset p of candidate combinations of n words for selection of one candidate combination of n words to be input to a location identifying module of the electronic device, said location identifying module resolving the selected candidate combination of n words to numerical location coordinates.

* * * * *